United States Patent
Smith et al.

(10) Patent No.: US 9,367,712 B1
(45) Date of Patent: Jun. 14, 2016

(54) HIGH DENSITY MEMORY CARD USING FOLDED FLEX

(75) Inventors: Lee J. Smith, Chandler, AZ (US);
Jeffrey Alan Miks, Chandler, AZ (US);
Curtis Michael Zwenger, Chandler, AZ (US); Barry Michael Miles, Chandler, AZ (US)

(73) Assignee: Amkor Technology, Inc., Tempe, AZ (US)

( * ) Notice: Subject to any disclaimer, the term of this patent is extended or adjusted under 35 U.S.C. 154(b) by 1614 days.

(21) Appl. No.: 11/681,121

(22) Filed: Mar. 1, 2007

(51) Int. Cl.
*G06K 19/00* (2006.01)
*G06K 7/00* (2006.01)

(52) U.S. Cl.
CPC .................................. *G06K 7/0021* (2013.01)

(58) Field of Classification Search
USPC ......................................... 235/441, 451, 492
See application file for complete search history.

(56) References Cited

U.S. PATENT DOCUMENTS

| | | | |
|---|---|---|---|
| 3,668,299 A | 6/1972 | McNeal | |
| 4,905,124 A | 2/1990 | Banjo et al. | |
| 4,974,120 A | 11/1990 | Kodai et al. | |
| 5,155,663 A | 10/1992 | Harase | |
| 5,244,840 A | 9/1993 | Kodai et al. | |
| 5,360,992 A | 11/1994 | Lowrey et al. | |
| 5,574,309 A | 11/1996 | Papapietro et al. | |
| 5,617,297 A * | 4/1997 | Lo et al. | 361/737 |
| 5,712,766 A | 1/1998 | Feldman | |
| 5,729,894 A | 3/1998 | Rostoker et al. | |
| 5,742,479 A | 4/1998 | Asakura | |
| 5,784,259 A | 7/1998 | Asakura | |
| 5,822,190 A | 10/1998 | Iwasaki | |
| 5,877,545 A * | 3/1999 | Prince et al. | 257/679 |
| 5,912,806 A | 6/1999 | Onoda et al. | |
| 5,977,613 A | 11/1999 | Takata et al. | |
| 6,053,414 A | 4/2000 | Stoll et al. | |
| 6,145,023 A | 11/2000 | Iwasaki | |
| 6,241,153 B1 * | 6/2001 | Tiffany, III | 235/488 |
| 6,341,728 B1 | 1/2002 | Kondo et al. | |
| 6,356,674 B1 | 3/2002 | Davis et al. | |
| 6,390,375 B2 | 5/2002 | Kayanakis | |
| 6,417,444 B1 | 7/2002 | Hirai et al. | |
| 6,433,285 B2 | 8/2002 | Maeda et al. | |
| 6,444,501 B1 | 9/2002 | Bolken | |
| 6,456,504 B1 | 9/2002 | LoForte et al. | |
| 6,603,196 B2 | 8/2003 | Lee et al. | |
| 6,616,053 B2 | 9/2003 | Kondo et al. | |

(Continued)

FOREIGN PATENT DOCUMENTS

| | | |
|---|---|---|
| JP | 3112688 | 5/1991 |
| JP | 7017175 | 1/1995 |

(Continued)

*Primary Examiner* — Matthew Mikels
(74) *Attorney, Agent, or Firm* — Kevin B. Jackson

(57) ABSTRACT

A memory card comprising a flexible substrate (a "flex") which is integrated in the memory card and folded in a prescribed manner subsequent to having various active and passive devices (e.g., controller and memory devices) surface mounted thereto. The active and passive devices are attached to a common side of the flex, and electrically connected to a conductive pattern disposed thereon. The conductive pattern itself electrically communicates with external signal contacts also formed on the flex. The use of folded flex technology in the memory card of the present invention allows the same to support four or more standard, pre-packaged memory devices, thus providing the memory card with substantially increased capacity.

20 Claims, 8 Drawing Sheets

(56) References Cited

U.S. PATENT DOCUMENTS

| | | |
|---|---|---|
| 6,624,005 B1 | 9/2003 | DiCaprio et al. |
| 6,783,076 B2 | 8/2004 | Kondo et al. |
| 6,855,891 B2 | 2/2005 | Eguchi et al. |
| 6,910,635 B1 | 6/2005 | Miks et al. |
| 6,911,718 B1 | 6/2005 | Alegre et al. |
| 6,965,159 B1 | 11/2005 | Miks et al. |
| 6,988,668 B2 | 1/2006 | Osako et al. |
| 6,998,702 B1 | 2/2006 | Zwenger et al. |
| 7,011,251 B1 | 3/2006 | Miks et al. |
| 7,057,268 B1 | 6/2006 | d'Estries |
| 2002/0020906 A1 | 2/2002 | Hirasawa et al. |
| 2002/0020923 A1 | 2/2002 | Kanatake |
| 2002/0043400 A1* | 4/2002 | Shinohara .................... 174/260 |
| 2002/0084332 A1 | 7/2002 | Kondo et al. |
| 2002/0190429 A1 | 12/2002 | Bolken |
| 2003/0127711 A1 | 7/2003 | Kawai et al. |
| 2005/0017081 A1 | 1/2005 | Kondo et al. |
| 2005/0030723 A1 | 2/2005 | Miks et al. |
| 2005/0085133 A1* | 4/2005 | Wang et al. .................... 439/660 |
| 2005/0099784 A1 | 5/2005 | Wallace |
| 2005/0182858 A1* | 8/2005 | Lo et al. ............................ 710/1 |
| 2006/0057892 A1 | 3/2006 | Bricaud et al. |
| 2006/0077644 A1* | 4/2006 | Nickerson et al. ............ 361/767 |
| 2006/0111190 A1 | 5/2006 | Yoshino et al. |
| 2007/0162698 A1* | 7/2007 | Hsien et al. .................... 711/115 |

FOREIGN PATENT DOCUMENTS

| | | |
|---|---|---|
| JP | 8190615 | 7/1996 |
| JP | 10334205 | 12/1998 |
| KR | 199410938 | 5/1994 |
| KR | 199552621 | 12/1995 |

* cited by examiner

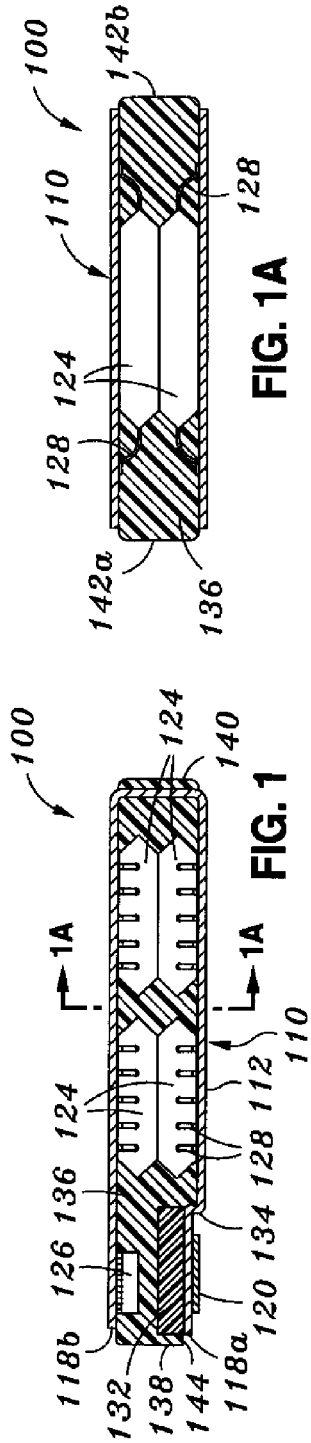
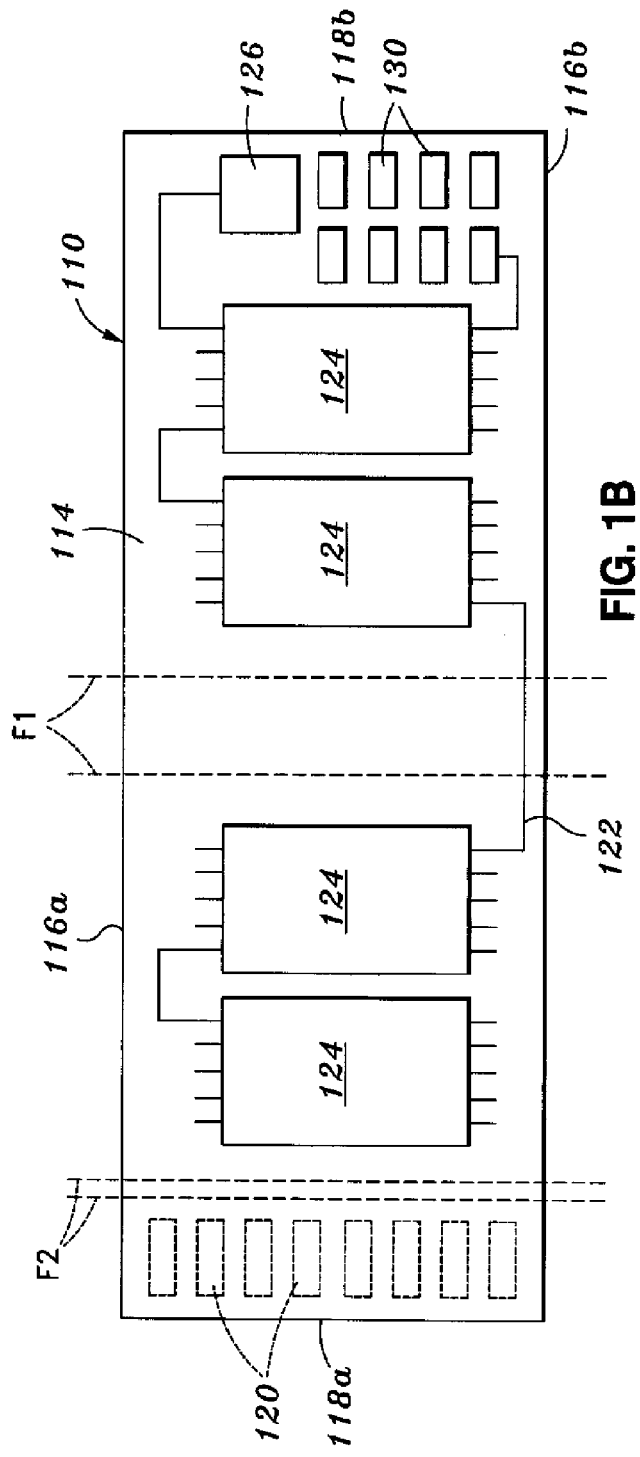
FIG. 1A
FIG. 1
FIG. 1B

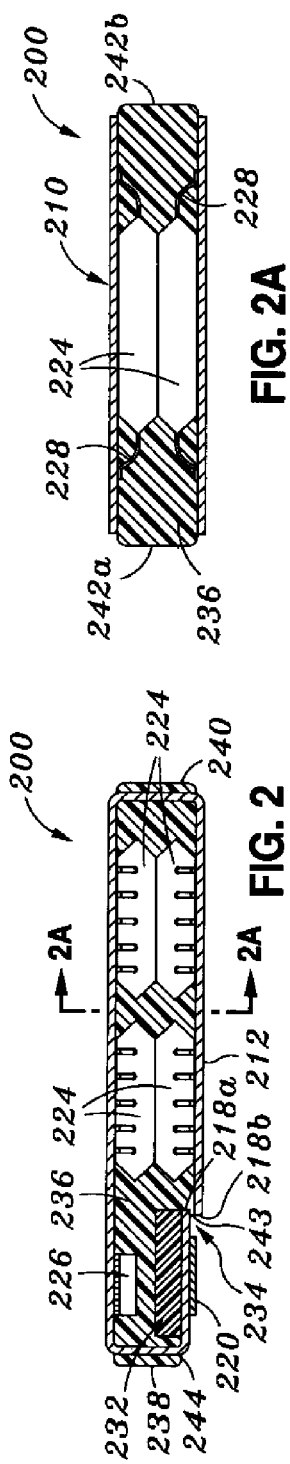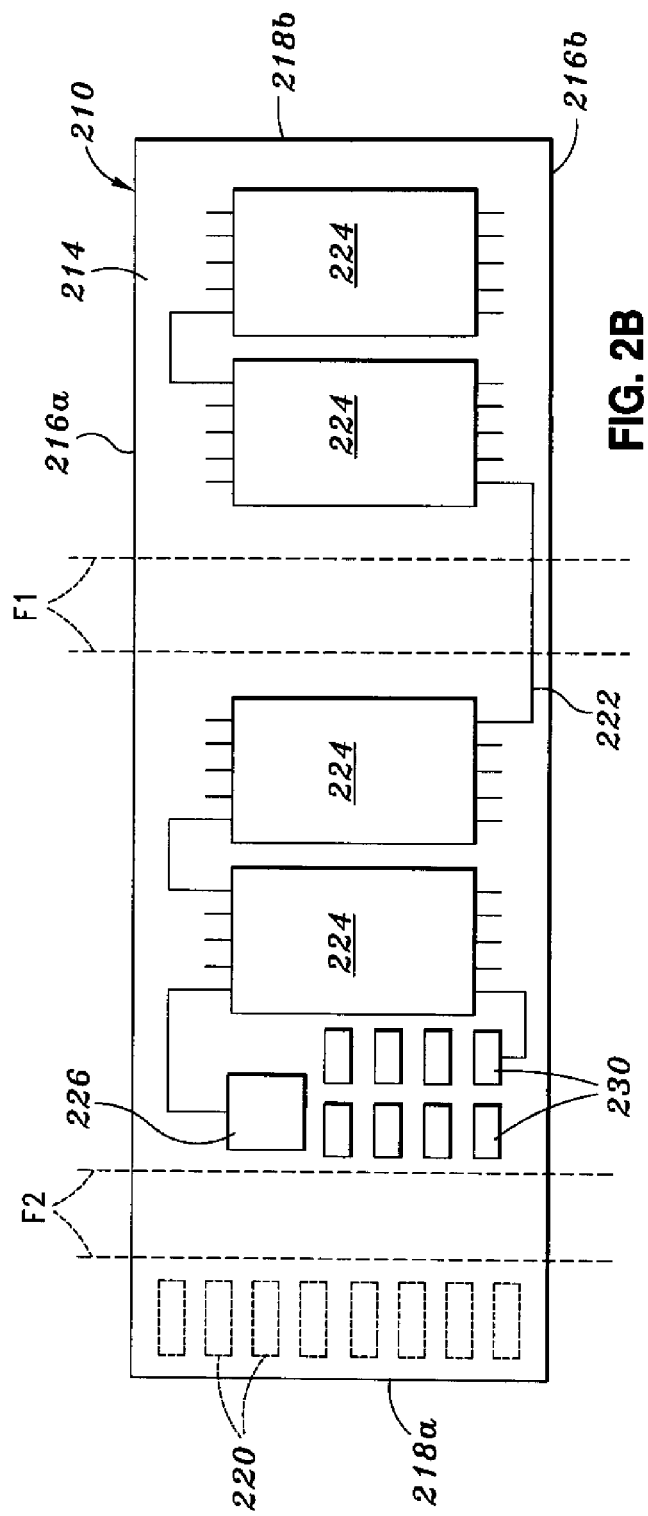

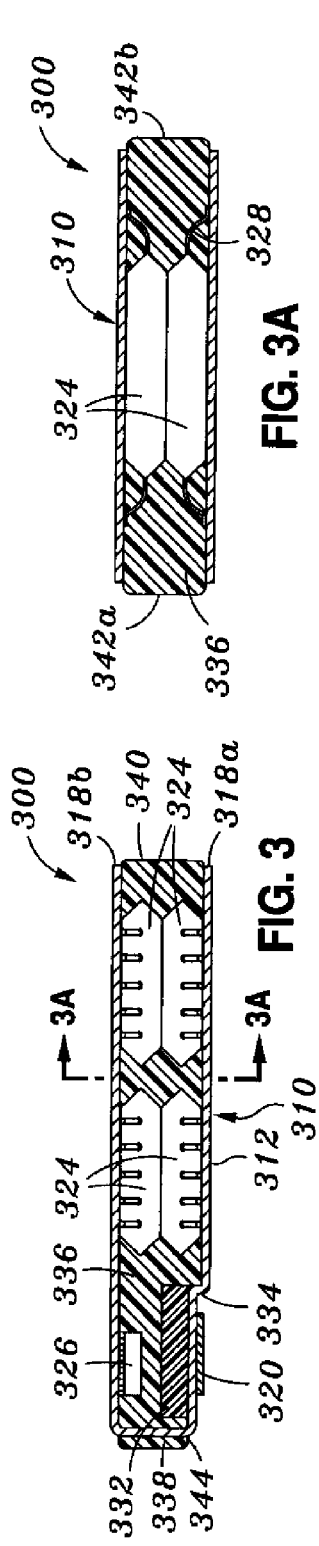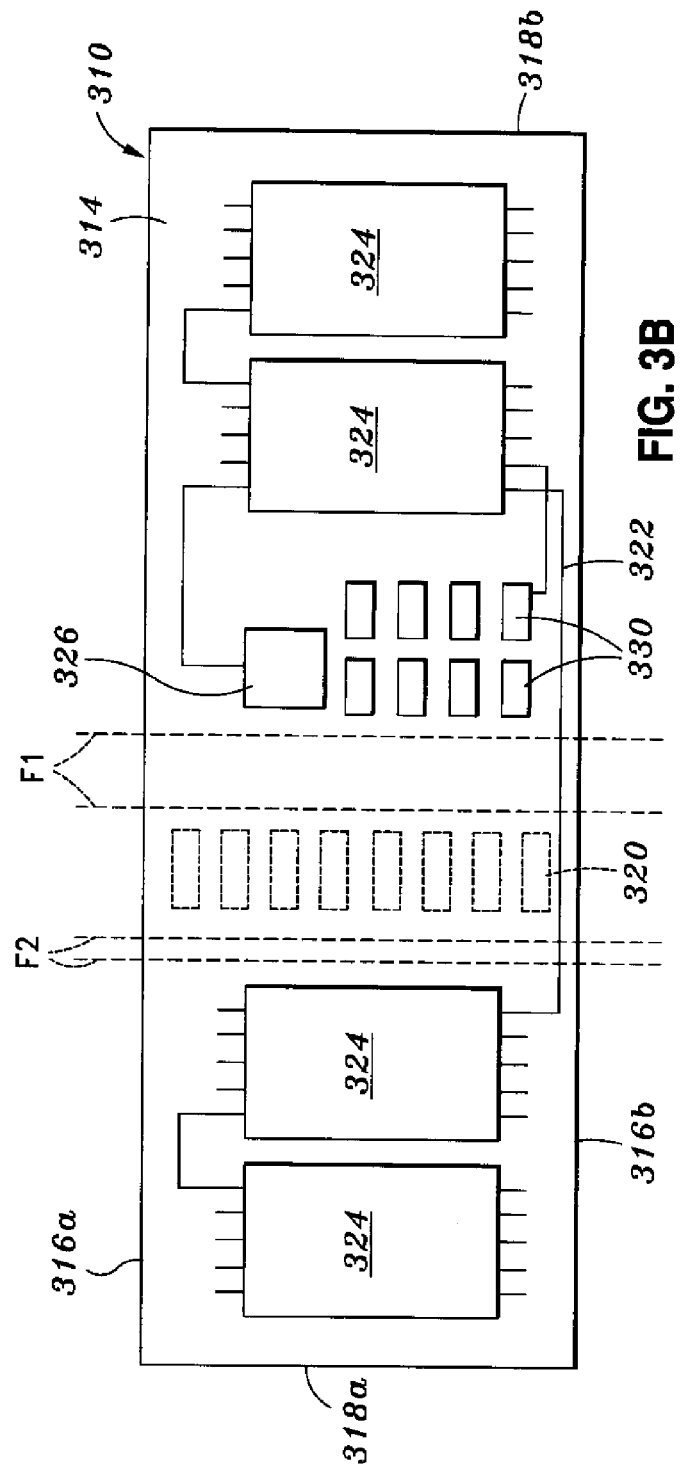

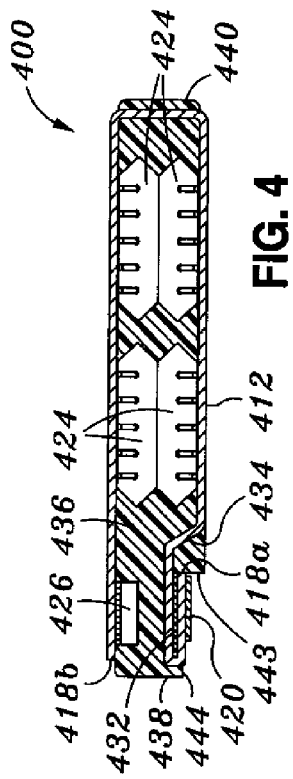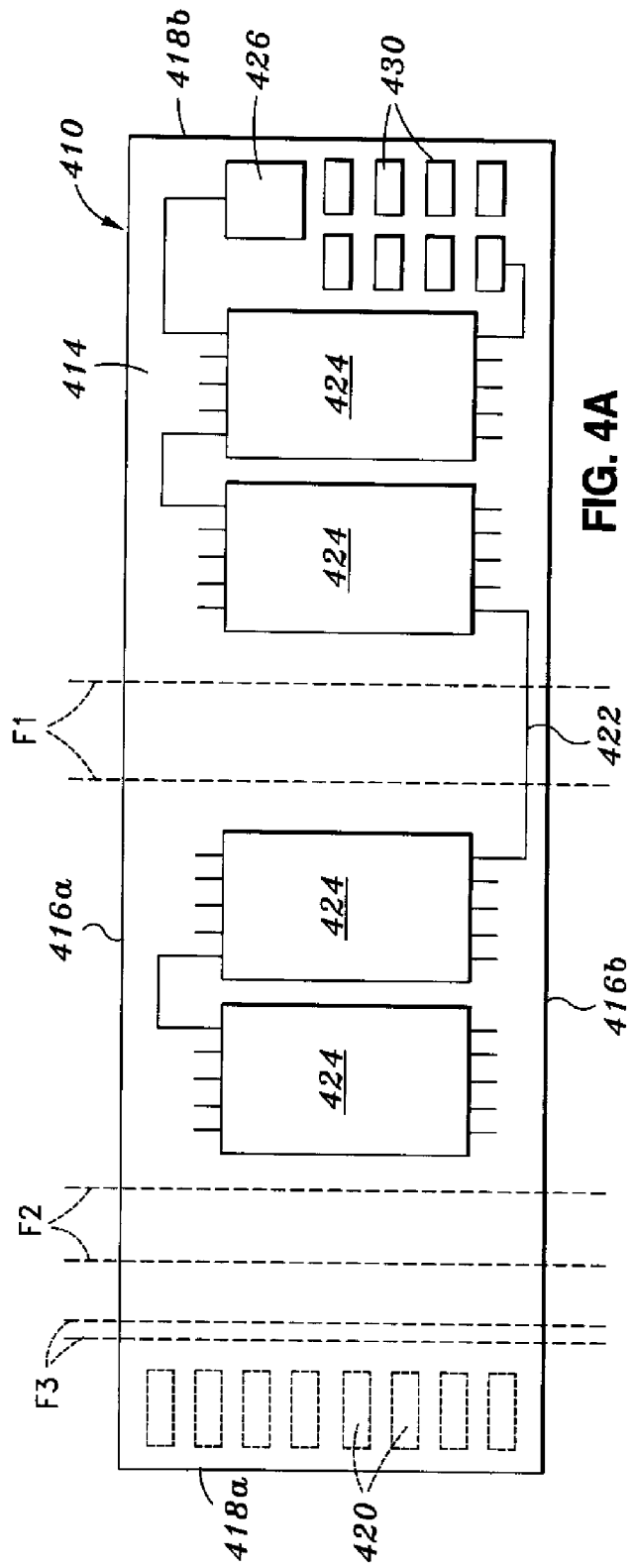

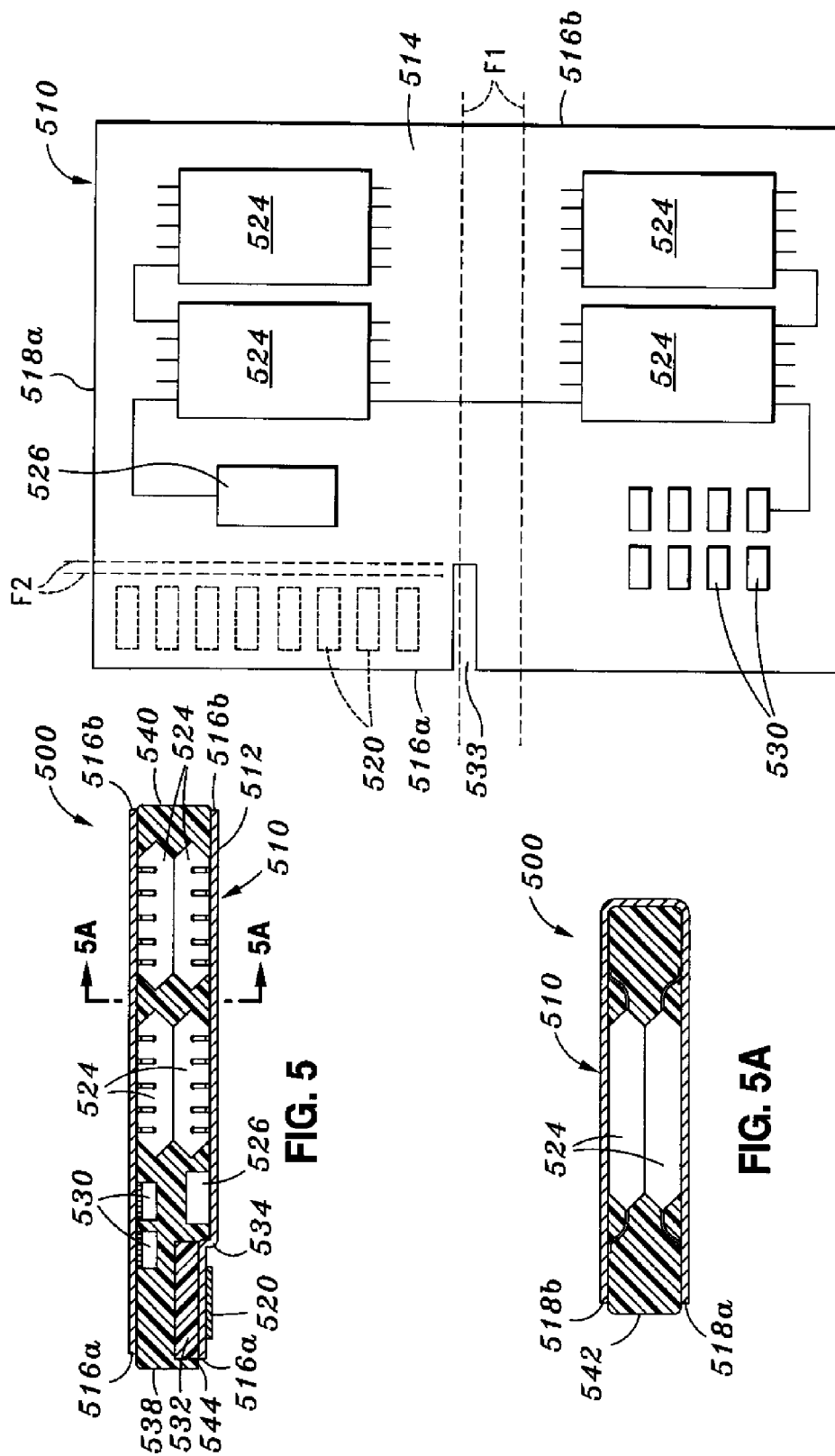

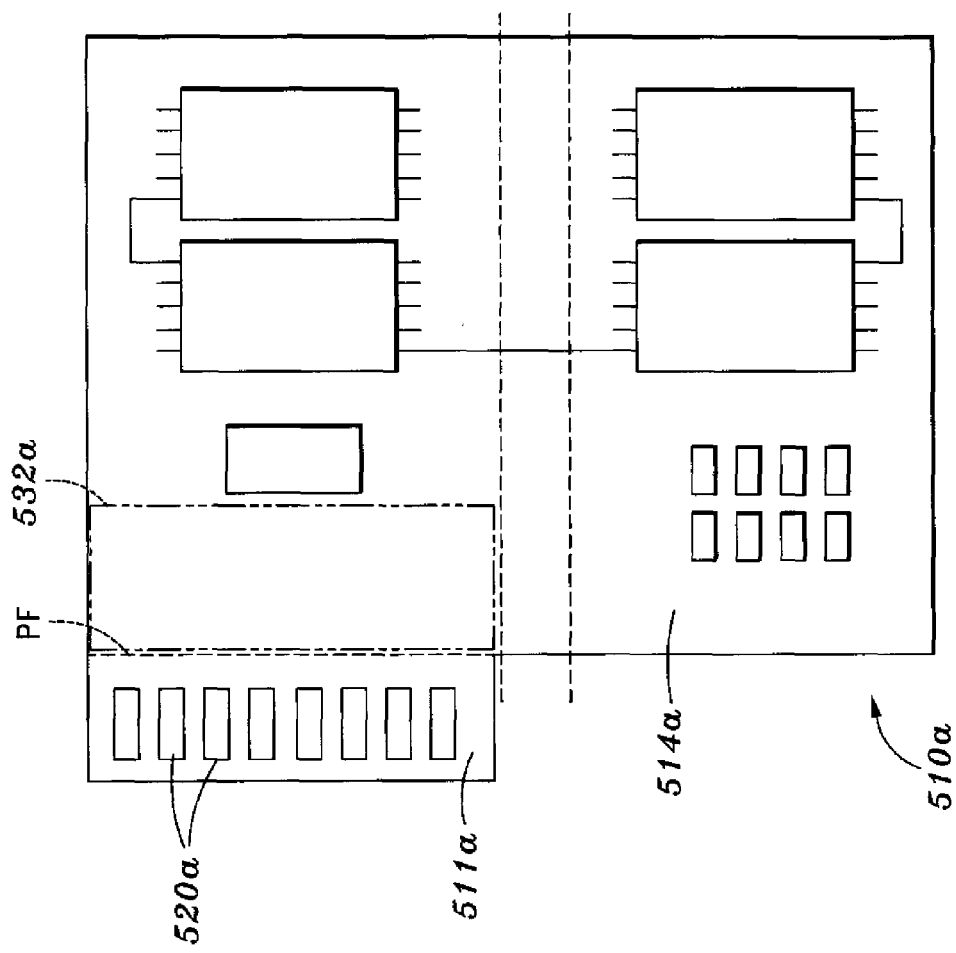

HIGH DENSITY MEMORY CARD USING FOLDED FLEX

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to memory cards, and more particularly to a memory card (e.g., a multi-media card or secure digital card) comprising a flexible substrate (a "flex") which is integrated in the memory card and folded in a prescribed manner subsequent to having various active and passive devices (e.g., controller and memory devices) surface mounted thereto for purposes of providing the memory card with increased capacity.

2. Description of the Related Art

As is well known in the electronics industry, memory cards are being used in increasing numbers to provide memory storage and other electronic functions for devices such as digital cameras, MP3 players, cellular phones, and personal digital assistants. In this regard, memory cards are provided in various formats, including multi-media cards and secure digital cards.

Many memory cards include a module which itself comprises a printed circuit board (PCB) having a conductive wiring pattern disposed thereon. Attached to one side or surface of the PCB and electrically connected to the conductive pattern thereof is a plurality of electronic circuit devices, such as semiconductor packages, semiconductor dies, and/or passive elements. These electronic circuit devices and a portion of the PCB are often covered or encapsulated by an encapsulant material. The PCB also includes a plurality of input/output (I/O) pads or external signal contacts (ESCs) disposed on the side or surface thereof opposite that having the electronic circuit devices thereon. These contacts are not covered by the encapsulant material, and thus are exposed in the completed module which comprises the PCB, the electronic circuit devices and the encapsulant material. Attached to the module is a skin or case of the memory card, such case generally defining the outer appearance of the memory card. The module is coupled to the case such that the contacts disposed on the PCB are not covered by the case, and thus remain exposed in the fully assembled memory card. These contacts of the memory card provide an external interface for an insertion point or socket. The completed memory card has a generally rectangular configuration, with most memory cards including a chamfer formed at one edge thereof which is adjacent to the contacts. In an effort to simplify the process steps needed to fabricate the memory card, there has been developed various memory cards wherein the case is eliminated by applying the encapsulant material the electronic devices and to the PCB such that the encapsulant material hardens into a cover or body of the memory card which is sized and configured to meet or achieve a desired "form factor" for the memory card.

Memory cards, as currently known, have a prescribed data storage capacity, such capacity corresponding to the electronic circuit devices integrated into the module. In conventional memory cards, the electronic circuit devices of the module include controllers and memory devices which store data and output it under the control of the controller. Since mobile devices such as digital cameras, digital camcorders, MP3 players and telecommunication devices need more data to implement various functions and services, there has been a corresponding increase in the need for increased data storage capacity in relation to the memory cards used in such mobile devices. At the current pace of technological development, the necessary data storage capacity of memory cards is doubling approximately every six months.

The present invention addresses the need for memory cards of increased capacity by providing a memory card comprising a flexible substrate (a "flex") which is integrated in the memory card and folded in a prescribed manner subsequent to having various active and passive devices (e.g., controller and memory devices) surface mounted thereto. The use of folded flex technology in the memory card of the present invention allows the same to support four or more standard, pre-packaged memory devices, thus providing the memory card with substantially increased capacity. These and other attributes of the present invention will be described in more detail below.

BRIEF SUMMARY OF THE INVENTION

In accordance with the present invention, there is provided various embodiments of a memory card comprising a flexible substrate (a "flex") which is integrated in the memory card and folded in a prescribed manner subsequent to having various active and passive devices (e.g., controller and memory devices) surface mounted thereto. The active and passive devices are attached to a common side of the flex, and electrically connected to a conductive pattern disposed thereon. The conductive pattern itself electrically communicates with external signal contacts also formed on the flex. In certain embodiments of the memory card, the contacts are formed on a side of the flex opposite that having the active and passive devices mounted and electrically connected thereto. In another embodiment, the contacts are formed on that side of the flex also having the active and passive devices mounted and electrically connected thereto.

Also integrated into the memory card of the present invention is a stiffener which is attached to the side of the flex opposite that having the contacts formed thereon, and is positioned so as to extend along and provide a firm support base for the contacts. In the present memory card, the active and passive devices, the stiffener and portions of the flex are covered by a housing or body formed from a hardened encapsulant material applied thereto. The use of folded flex technology in the memory card of the present invention allows the same to support four or more standard, pre-packaged memory devices, thus providing the memory card with substantially increased capacity.

The present invention will be more apparent from the following detailed description taken in conjunction with the accompanying drawings.

BRIEF DESCRIPTION OF THE DRAWINGS

These, as well as other features of the present invention, will become more apparent upon reference to the drawings wherein:

FIG. 1 is a cross-sectional view of a memory card constructed in accordance with a first embodiment of the present invention;

FIG. 1A is a cross-sectional view taken along line A-A of FIG. 1;

FIG. 1B is a top plan view of the flex of the memory card shown in FIGS. 1 and 1A in an unfolded state subsequent to the surface mounting of the active and passive devices of the memory card thereto;

FIG. 2 is a cross-sectional view of a memory card constructed in accordance with a second embodiment of the present invention;

FIG. 2A is a cross-sectional view taken along line A-A of FIG. 2;

FIG. 2B is a top plan view of the flex of the memory card shown in FIGS. 2 and 2A in an unfolded state subsequent to the surface mounting of the active and passive devices of the memory card thereto;

FIG. 3 is a cross-sectional view of a memory card constructed in accordance with a third embodiment of the present invention;

FIG. 3A is a cross-sectional view taken along line A-A of FIG. 3;

FIG. 3B is a top plan view of the flex of the memory card shown in FIGS. 3 and 3A in an unfolded state subsequent to the surface mounting of the active and passive devices of the memory card thereto;

FIG. 4 is a cross-sectional view of a memory card constructed in accordance with a fourth embodiment of the present invention;

FIG. 4A is a top plan view of the flex of the memory card shown in FIGS. 4 and 4A in an unfolded state subsequent to the surface mounting of the active and passive devices of the memory card thereto;

FIG. 5 is a cross-sectional view of a memory card constructed in accordance with a fifth embodiment of the present invention;

FIG. 5A is a cross-sectional view taken along line A-A of FIG. 5;

FIG. 5B is a top plan view of the flex of the memory card shown in FIGS. 5 and 5A in an unfolded state subsequent to the surface mounting of the active and passive devices of the memory card thereto;

FIG. 8 is a top plan view of an alternative flex in an unfolded state which may optionally be integrated into the memory card of the embodiment shown in FIG. 5.

Common reference numerals are used throughout the drawings and the detailed description to indicate the same elements.

DETAILED DESCRIPTION OF THE INVENTION

Figure 6:
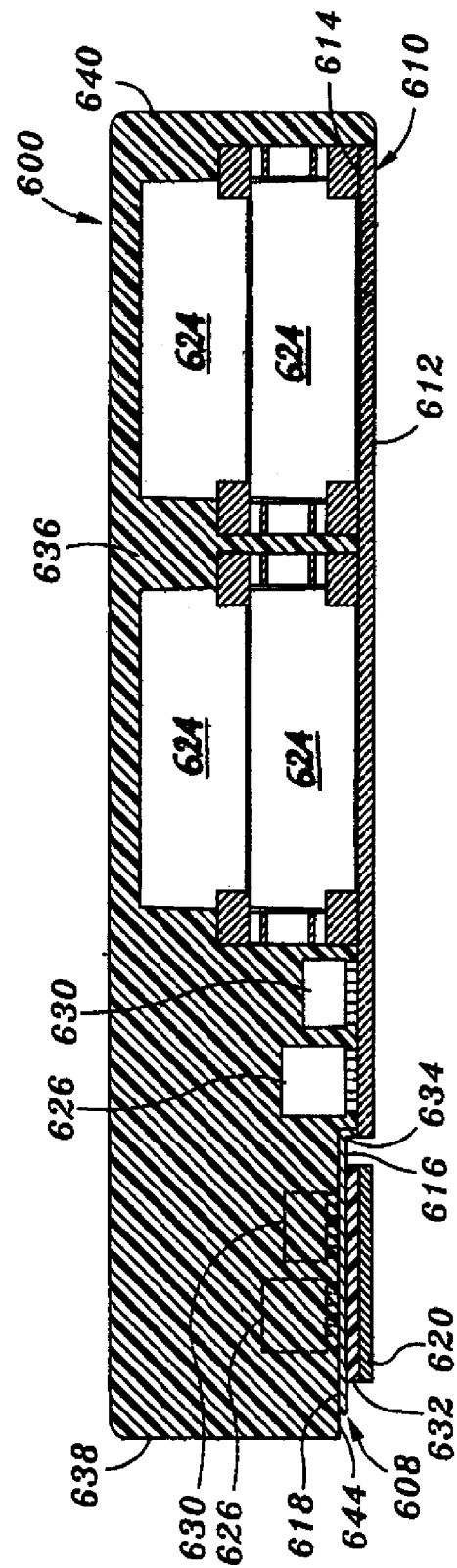
FIG. 6 is a cross-sectional view of a memory card constructed in accordance with a sixth embodiment of the present invention.

Referring now to the drawings wherein the showings are for purposes of illustrating preferred embodiments of the present invention only, and not for purposes of limiting the same, FIGS. 1-1B depict a memory card 100 constructed in accordance with a first embodiment of the present invention. The memory card 100, as well as the memory cards of other embodiments of the present invention which will be described in more detail below, may be a multi-media card (MMC), a reduced size multi-media card (RSMMC), a secure digital (SD) card, or similar memory cards.

The memory card 100 includes a flexible substrate 110, hereinafter referred to as the flex 110. The flex 110 is preferably an insulative sheet which defines a generally planar bottom surface 112 and an opposed, generally planar top surface 114. The flex 110 has a generally quadrangular (e.g., rectangular) configuration defining an opposed pair of longitudinally extending peripheral edge segments 116a, 116b and an opposed pair of laterally extending peripheral edge segments 118a, 118b. Disposed on the bottom surface 112 of the flex 110 is a plurality of external signal contacts (ESCs) 120. As shown in FIG. 1B, the contacts 120 are arranged in a single row which extends in close proximity and in generally parallel relation to the lateral peripheral edge segment 118a of the flex 110. As will be recognized, the contacts 120 are used to facilitate the electrical connection of the memory card 100 to the pins or contacts within the host socket of an external device with which the memory card 100 is to be used. Disposed on the top surface 114 of the flex 110 is a conductive pattern 122, only a portion of which is shown in FIG. 1B. The conductive pattern 122 is placed into electrical communication with the contacts 120 on the bottom surface 112 through a conductive medium formed through and/or upon the flex 110. Such conductive medium may include conductive vias and/or conductive traces which extend through and/or along the flex 110.

Mounted to the top surface 114 of the flex 110 and electrically connected to the conductive pattern 122 disposed thereon is a plurality of memory devices 124. Each memory device 124 may comprise flash memory having a prescribed data storage capacity. As shown in FIG. 1B, the memory devices 124 are mounted to the flex 110 in a manner wherein they are segregated into a first pair or set which is disposed in relative close proximity to the lateral peripheral edge segment 118a, and a second pair or set which is disposed in relative close proximity to the lateral peripheral edge segment 118b. In addition to the memory devices 124, also mounted to the top surface 114 of the flex 110 and electrically connected to the conductive pattern 122 is a controller device 126. As also shown in FIG. 1B, it is contemplated that the controller device 126 will be located between the memory devices 124 of the second set and the lateral peripheral edge segment 118b of the flex 110. The controller device 126 preferably comprises a semiconductor die having the logic necessary for controlling the operation of the memory card 100. Since the controller device 126 is electrically connected to the memory devices 124 by the conductive pattern 122, the controller device 126 is operative to control the processes of the memory card 100 for transmitting/receiving data to/from an external device and storing data on the memory devices 124.

As shown in FIG. 1, the controller device 126 is electrically connected to the conductive pattern 122 through the use of a flip-chip type connection, though wire bond or surface mount type connections may also be used to facilitate such electrical connection. In contrast, the electrical connection of the memory devices 124 to the conductive pattern 122 is facilitated by electrically connecting leads 128 of each of the memory devices 124 to the conductive pattern 122. However, those of ordinary skill in the art will recognize that, depending on the configuration of the memory devices 124, a flip-chip connection may also be used to facilitate the electrical connection thereof to the conductive pattern 122. In the event such flip-chip type connection is not employed to facilitate the electrical connection of the memory devices 124 to the conductive pattern 122 (i.e., the electrical connection is facilitated by the use of the leads 128), it is also contemplated that the mounting of the memory devices 124 to the flex 110 may be assisted by interposing a layer of a suitable adhesive between each memory device 124 and the top surface 114 of the flex 110.

As is further seen in FIG. 1B, in addition to the memory and controller devices 124, 126, the memory card 100 is preferably provided with a plurality of passive devices 130 which are also mounted to the top surface 114 of the flex 110 and electrically connected to the conductive pattern 122 thereof. Like the controller device 126, it is contemplated that the passive devices 130 will be located between the memory devices 124 of the second set and the lateral peripheral edge segment 118b of the flex 110. It is also contemplated that a flip-chip interconnection will also be used to facilitate the electrical connection of the passive devices 130 to the conductive pattern 122. As will be recognized by those of ordinary skill in the art, the conductive pattern 122 and the above-described conductive medium may be used to facilitate the placement of the memory, controller and passive devices 124, 126, 130 into electrical communication with each other and with the contacts 120 in any desired pattern or arrangement. Further, the type, number and arrangement of the memory, controller and passive devices 124, 126, 130 may be varied from that shown in FIG. 1B depending on the desired application for the memory card 100, without necessarily departing from the spirit and scope of the present invention. Along these lines, the number of contacts 120 included on the flex 110 is also variable, and may be set in accordance with the particular application for the memory card 100.

In fabricating the memory card 100, the flex 110 is originally provided in the unfolded state shown in FIG. 1B, with the memory, controller and passive devices 124, 126, 130 being mounted to the top surface 114 thereof and electrically connected to the conductive pattern 122 in the arrangement also shown in FIG. 1B. Prior or subsequent to such mounting and electrical connection, a stiffener 132 is adhesively attached to the top surface 114 of the flex 110. The stiffener 132 preferably has a generally quadrangular (e.g., rectangular) configuration, and is mounted to the flex 110 such that one of the longitudinal sides of the stiffener 132 extends along and in generally flush relation to the lateral peripheral edge segment 118a, with each of the lateral sides of the stiffener 132 extending along and in substantially flush relation with portions of respective ones of the longitudinal peripheral edge segments 116a, 116b. The preferred width of the stiffener 132 is also such that, when affixed to the flex 110, the stiffener 132 overlaps the entirety of the contacts 120 located in opposed relation thereto on the bottom surface 112 of the flex 110.

Subsequent to the mounting of the stiffener 132 to the flex 110 in the above-described manner, the flex 110 is folded along a first set of fold lines F1 and a second set of fold lines F2 which are also shown in FIG. 1B. The folding of the flex 110 along the fold lines F1 effectively places the top surfaces of the memory devices 124 of the second set (the top surfaces being those surfaces disposed furthest from the flex 110) in direct engagement with the top surfaces of the memory devices 124 of the first set disposed closest to the contacts 120 in the manner best shown in FIG. 1. The folding of the flex 110 along the fold lines F1 also causes the controller device 126 and the passive devices 130 to assume positions disposed generally above and in spaced relation to the stiffener 132, as also shown in FIG. 1. The folding of the flex 110 along the fold lines F2 facilitates the formation of a step 134 in the flex 110 which results in that portion of the flex 110 having the stiffener 132 mounted thereto and the contacts 120 formed thereon (i.e., the portion of the flex 110 extending between the lateral peripheral edge segment 118a and the fold line F2 closest thereto) being offset or slightly elevated relative to that portion of the flex 110 extending between the fold lines F1, F2 closest to each other. As is apparent from the foregoing, as a result of the folding of the flex 110 in the above-described manner, the folded flex 110 defines juxtaposed portions having the memory, controller and passive devices 124, 126, 130 disposed therebetween. Stated another way, the folded flex 110 defines a partially enclosed interior cavity which accommodates the memory, controller and passive devices 124, 126, 130, as well as the stiffener 132.

After the flex 110 has been folded along the fold lines F1, F2 in the above-described manner, a layer of encapsulant material is applied to the folded flex 110, such encapsulant material ultimately hardening into a body 136 of the memory card 100. More particularly, the encapsulant material is injected or otherwise channeled into the above-described partially enclosed interior cavity defined by the folded flex 110. As best shown in FIG. 1, the fully formed body 136 covers the memory, controller and passive devices 124, 126, 130, the stiffener 132, and the entirety of the exposed portion of the top surface 114 of the flex 110, including the conductive pattern 122 disposed thereon. As seen in FIGS. 1 and 1A, the fully formed body 136 also defines a generally planar front or leading side 138 which extends forwardly of and slightly beyond the vertically aligned lateral peripheral edge segments 118a, 118b of the folded flex 110, and a generally planar rear or trailing side 140 which extends slightly rearwardly beyond and thus covers that portion of the bottom surface 112 of the folded flex 110 which extends between the fold lines F1 thereof. The body 136 further defines an opposed pair of generally planar side surfaces 142a, 142b which extend slightly outwardly beyond respective ones of the longitudinal peripheral edge segments 116a, 116b of the folded flex 110, as shown in FIG. 1A.

In the memory card 100, the height of the leading side 138 of the body 136 is slightly less than that of the trailing side 140 thereof. Advantageously, the formation of the step 134 in the flex 110 accommodates this height differential and allows the contacts 120 to be maintained in generally co-planar relation to a bottom surface 144 of the body 136 which extends to the leading side 138 thereof. Due to the manner in which the body 136 is preferably formed, those portions of the bottom surface 112 of the folded flex 110 extending between the fold lines F1 and respective ones of the lateral peripheral edge segments 118a, 118b of the folded flex 110 remain exposed in the memory card 100 (i.e., only that portion of the bottom surface 112 extending between the fold lines F1 is covered). However, those of ordinary skill in the art will recognize that alternative configurations of the body 136 are contemplated to be within the spirit and scope of the present invention. For example, it is contemplated that the body 136 may be formed such that the entirety of the bottom surface 112 of the folded flex 110, except for that portion thereof extending between the lateral peripheral edge segment 118a and the closest one of the fold lines F2 thereto, may be covered by the body 136. Additionally, though the flex 110 is preferably folded along the fold lines F2 to facilitate the formation of the step 134, it is also contemplated that the memory card 100 may be formed so as not to include the step 134, thus eliminating any folding thereof along the fold lines F2.

Referring now to FIGS. 2, 2A and 2B, there is shown a memory card 200 constructed in accordance with a second embodiment of the present invention. The memory card 200 of the second embodiment bears substantial similarity in construction to the memory card 100 of the first embodiment, with the 200 series reference numerals in FIGS. 2, 2A and 2B being used to identify the same structures identified by the corresponding 100 series reference numerals included in FIGS. 1, 1A and 1B. In this regard, only the distinctions between the memory cards 200, 100 will be discussed below.

In the memory card 200, the contacts 220 are disposed on the bottom surface 212 of the flex 210. More particularly, the contacts 220 are arranged in a single row on the bottom surface 212 which extends in close proximity and in generally parallel relation to the lateral peripheral edge segment 218a of the flex 210. Additionally, the controller device 226 and passive devices 230 are located on the top surface 214 between the memory devices 224 of the first set and the contacts 220 disposed on the opposed bottom surface 212, as opposed to being positioned between the memory devices 224 of the second set and the lateral peripheral edge segment 218b of the flex 210 as described above in relation to the memory card 100.

In addition, in the memory card 200 the stiffener 232 is adhesively attached to the top surface 214 of the flex 210. The stiffener 232 is mounted to the flex 210 such that one of the longitudinal sides of the stiffener 232 extends along and in generally flush relation to the lateral peripheral edge segment 218a, with each of the lateral sides of the stiffener 232 extending along and in substantially flush relation with portions of respective ones of the longitudinal peripheral edge segments 216a, 216b. The preferred width of the stiffener 232 is also such that, when affixed to the flex 210, the stiffener 232 overlaps the entirety of the contacts 220 located in opposed relation thereto on the bottom surface 212 of the flex 210.

In the memory card 200, the flex 210 is folded along a first set of fold lines F1 and a second set of fold lines F2 which are each shown in FIG. 2B. The folding of the flex 210 along the fold lines F1 effectively places the top surfaces of the memory devices 224 of the first set disposed closest to the contacts 220 in direct engagement with the top surfaces of the memory devices 224 of the second set disposed closest to the lateral peripheral edge segment 218b in the manner best shown in FIG. 2. The folding of the flex 210 along the fold lines F2 results in the stiffener 232 assuming a position disposed generally below and in spaced relation to the controller device 226 and passive devices 230, as also shown in FIG. 2. The folding of the flex 210 along the fold lines F2 also facilitates the formation of a step or lateral offset 234 between the portion of the flex 210 extending between the lateral peripheral edge segment 218a and the closest one of the fold lines F2 thereto (i.e., that portion of the flex 210 having the stiffener 232 mounted thereto), and the portion of the flex 210 extending between the lateral peripheral edge segment 218b and the closest one of the fold lines F1 thereto. As a result, the offset 234 is essentially defined between the vertically aligned, spaced lateral peripheral edge segments 218a, 218b of the folded flex 210.

As best shown in FIGS. 2 and 2A, the fully formed body 236 of the memory card 200 covers the memory, controller and passive devices 224, 226, 230, the stiffener 232, and the entirety of the exposed portion of the top surface 214 of the flex 210, including the conductive pattern 222 disposed thereon. The fully formed body 236 also defines a generally planar front or leading side 238 which extends slightly forwardly beyond and thus covers that portion of the bottom surface 212 of the folded flex 210 which extends between the fold lines F2 thereof, and a generally planar rear or trailing side 240 which extends slightly rearwardly beyond and thus covers that portion of the bottom surface 212 of the folded flex 210 which extends between the fold lines F1 thereof. The body 236 further defines an opposed pair of generally planar side surfaces 242a, 242b which extend slightly outwardly beyond respective ones of the longitudinal peripheral edge segments 216a, 216b of the folded flex 210, as shown in FIG. 2A. Also defined by the body 236 is a shoulder 243 which spans the offset 234 described above.

In the memory card 200, the height of the leading side 238 of the body 236 is slightly less than that of the trailing side 240 thereof. Advantageously, the formation of the offset 234 and hence the shoulder 243 accommodates this height differential and allows the contacts 220 to be maintained in generally co-planar relation to a bottom surface 244 of the body 236 which extends to the leading side 238 thereof. Due to the manner in which the body 236 is preferably formed, only those portions of the bottom surface 212 of the folded flex 210 extending between the fold lines F1 and between the fold lines F2 are covered by the body 236, the remainder of the bottom surface 212 being exposed in the memory card 200. However, those of ordinary skill in the art will recognize that alternative configurations of the body 236 are contemplated to be within the spirit and scope of the present invention. For example, it is contemplated that the body 236 may be formed such that the entirety of the bottom surface 212 of the folded flex 210, except for that portion thereof extending between the lateral peripheral edge segment 218a and the closest one of fold lines F2 thereto, may be covered by the body 236. Additionally, the fold lines F2 may be configured such that the folding of the flex 210 along such fold lines F2 does not facilitate the formation of the offset 234.

Referring now to FIGS. 3, 3A and 3B, there is shown a memory card 300 constructed in accordance with a third embodiment of the present invention. The memory card 300 of the third embodiment bears substantial similarity in construction to the memory cards 100 and 200 of the first and second embodiments, with the 300 series reference numerals in FIGS. 3, 3A and 3B being used to identify the same structures identified by the corresponding 100 and 200 series reference numerals included in FIGS. 1, 1A and 1B and in FIGS. 2, 2A and 2B, respectively. In this regard, only the distinctions between the memory cards 300, 200 will be discussed below.

In the memory card 300, the contacts 320 are disposed on the bottom surface 312 of the flex 310. More particularly, the contacts 320 are arranged in a single row on the bottom surface 312 which extends between the memory devices 324 of the first and second sets disposed on the opposed top surface 314. Additionally, the controller device 326 and passive devices 330 are located on the top surface 314 between the memory devices 324 of the first and second sets thereof. More particularly, the controller device 326 and passive devices 330 are located on the top surface 314 between the memory devices 324 of the second set disposed closest to the lateral peripheral edge segment 318b and the contacts 320 disposed on the opposed bottom surface 312 of the flex 310.

In addition, in the memory card 300 the stiffener 332 is adhesively attached to the top surface 314 of the flex 310. The stiffener 332 is mounted to the flex 310 such that each of the lateral sides of the stiffener 332 extends along and in substantially flush relation with portions of respective ones of the longitudinal peripheral edge segments 316a, 316b of the flex 310. The preferred width of the stiffener 332 is also such that, when affixed to the flex 310, the stiffener 332 overlaps the entirety of the contacts 320 located in opposed relation thereto on the bottom surface 312 of the flex 310.

In the memory card 300, the flex 310 is folded along a first set of fold lines F1 and a second set of fold lines F2 which are each shown in FIG. 3B. The folding of the flex 310 along the fold lines F1, F2 effectively places the top surfaces of the memory devices 324 of the second set disposed to the lateral peripheral edge segment 318b in direct engagement with the top surfaces of the memory devices 324 of the first set disposed closest to the lateral peripheral edge segment 318a in the manner best shown in FIG. 3. The folding of the flex 310 along the fold lines F1, F2 also causes the controller device 326 and the passive devices 330 to assume positions disposed generally above and in spaced relation to the stiffener 332, as also shown in FIG. 3. The folding of the flex 310 along the fold lines F2 further facilitates the formation of a step 334 in the flex 310 which results in that portion of the flex 310 having the stiffener 332 mounted thereto and the contacts 320 formed thereon (i.e., the portion of the flex 310 extending between the fold lines F1, F2 closest to each other) being offset or slightly elevated relative to that portion of the flex 310 extending between the lateral peripheral edge segment 318a and the fold line F2 closest thereto.

As best shown in FIGS. 3 and 3A, the fully formed body 336 of the memory card 300 covers the memory, controller and passive devices 324, 326, 330, the stiffener 332, and the entirety of the exposed portion of the top surface 314 of the flex 310, including the conductive pattern 322 disposed thereon. The fully formed body 336 also defines a generally planar front or leading side 338 which extends slightly forwardly beyond and thus covers that portion of the bottom surface 312 of the folded flex 310 which extends between the fold lines F1 thereof, and a generally planar rear or trailing side 340 which extends slightly rearwardly beyond the vertically aligned lateral peripheral edge segments 318a, 318b of the folded flex 310. The body 336 further defines an opposed pair of generally planar side surfaces 342a, 342b which extend slightly outwardly beyond respective ones of the longitudinal peripheral edge segments 316a, 316b of the folded flex 310, as shown in FIG. 3A.

In the memory card 300, the height of the leading side 338 of the body 336 is slightly less than that of the trailing side 340 thereof. Advantageously, the formation of the step 334 accommodates this height differential and allows the contacts 320 to be maintained in generally co-planar relation to a bottom surface 344 of the body 336 which extends to the leading side 338 thereof. Due to the manner in which the body 336 is preferably formed, only that portion of the bottom surface 312 of the folded flex 310 extending between the fold lines F1 is covered by the body 336, the remainder of the bottom surface 312 being exposed in the memory card 300. However, those of ordinary skill in the art will recognize that alternative configurations of the body 336 are contemplated to be within the spirit and scope of the present invention. For example, it is contemplated that the body 336 may be formed such that the entirety of the bottom surface 312 of the folded flex 310, except for that portion thereof extending between the fold lines F1, F2 disposed closest to each other, may be covered by the body 336. Additionally, though the flex 310 is preferably folded along the fold lines F2 to facilitate the formation of the step 334, it is also contemplated that the memory card 300 may be formed so as not to include the step 334, thus eliminating any folding thereof along the fold lines F2.

Referring now to FIGS. 4 and 4A, there is shown a memory card 400 constructed in accordance with a fourth embodiment of the present invention. The memory card 400 of the fourth embodiment bears similarity in construction to the memory card 100 of the first embodiment, with the 400 series reference numerals in FIGS. 4 and 4A being used to identify the same structures identified by the corresponding 100 series reference numerals included in FIGS. 1, 1A and 1B. In this regard, only the distinctions between the memory cards 400, 100 will be discussed below.

In the memory card 400, the contacts 420 are disposed on the top surface 414 of the flex 410, as opposed to being disposed on the bottom surface 412 of the flex 410 as in the above-described memory cards 100, 200, 300. More particularly, the contacts 420 are arranged in a single row on the top surface 414 which extends in close proximity and in generally parallel relation to the lateral peripheral edge segment 418a of the flex 410. Additionally, the controller device 426 and passive devices 430 are located on the top surface 414 between the memory devices 424 of the second set and the lateral peripheral edge segment 418b of the flex 410.

In addition, in the memory card 400 the stiffener 432 is adhesively attached to the bottom surface 412 of the flex 410. The stiffener 432 is mounted to the flex 410 such that one of the longitudinal sides of the stiffener 432 extends along and in generally flush relation to the lateral peripheral edge segment 418a, with each of the lateral sides of the stiffener 432 extending along and in substantially flush relation with portions of respective ones of the longitudinal peripheral edge segments 416a, 416b. The preferred width of the stiffener 432 is also such that, when affixed to the flex 410, the stiffener 432 overlaps the entirety of the contacts 420 located in opposed relation thereto on the top surface 414 of the flex 410.

In the memory card 400, the flex 410 is folded along first, second and third sets of fold lines F1, F2, F3 which are shown in FIG. 4A. The folding of the flex 410 along the fold lines F1 effectively places the top surfaces of the memory devices 424 of the second set disposed closest to the peripheral edge segment 418b in direct engagement with the top surfaces of the memory devices 424 of the first set disposed closest to the contacts 420 in the manner best shown in FIG. 4. The folding of the flex 410 along the fold lines F2 facilitates the formation of a sloped section 434 within the flex 410, such sloped section 434 extending between the stiffener 432 and the memory devices 424 of the first set. As a result of the formation of the sloped section 434, that portion of the bottom surface 412 to which the stiffener 432 is attached and that portion of the bottom surface 412 extending between the fold lines F1, F2 which are disposed closest to each other extend along respective ones of a spaced, generally parallel pair of planes.

The folding of the flex 410 along the fold lines F3 causes the stiffener 432 to be partially wrapped by the flex 410 in the manner also shown in FIG. 4. More particularly, the opposed top and bottom surfaces and one of the longitudinal side surfaces of the stiffener 432 are each covered by portions of the bottom surface 412 of the flex 410 as a result of the folding of the flex 410 along the fold lines F3. It is contemplated that the portion of the bottom surface 412 extending between the sloped section 434 and the fold line F3 disposed closest thereto will also be adhesively secured to the stiffener 432 subsequent to the completion of the folding of the flex 410 along the fold lines F3. The folding of the flex 410 along the fold lines F3 also results in the stiffener 432 assuming a position disposed generally below and in spaced relation to the controller device 426 and passive devices 430, as also shown in FIG. 4.

In the memory card 400, the fully formed body 436 covers the memory, controller and passive devices 424, 426, 430, two of the lateral side surfaces and one of the longitudinal side surfaces of the stiffener 432, and the entirety of the exposed portion of the top surface 414 of the flex 410, including the conductive pattern 422 disposed thereon. As seen in FIG. 4, the fully formed body 436 also defines a generally planar front or leading side 438 which extends forwardly of and slightly beyond the lateral peripheral edge segment 418b and the portion of the top surface 414 of the folded flex 410 extending between the fold lines F3, and a generally planar rear or trailing side 440 which extends slightly rearwardly beyond and thus covers that portion of the bottom surface 412 of the folded flex 410 which extends between the fold lines F1 thereof. The body 436 further defines an opposed pair of generally planar side surfaces which extend slightly outwardly beyond respective ones of the longitudinal peripheral edge segments 416a, 416b of the folded flex 410, in a manner similar to that shown in FIG. 1A.

In the memory card 400, the height of the leading side 438 of the body 436 is slightly less than that of the trailing side 440 thereof. Advantageously, the formation of the sloped section 434 in the flex 410 assists in accommodating this height differential and allows the contacts 420 to be maintained in generally co-planar relation to a bottom surface 444 of the body 136 which extends to the leading side 438 thereof. Also defined by the body 436 is a shoulder 443 which extends generally perpendicularly relative to the bottom surface 444. Due to the manner in which the body 436 is preferably formed, only those portions of the bottom surface 412 of the folded flex 410 extending between the fold lines F1 and between the fold lines F2 are covered, along with a small portion of the bottom surface 412 extending between the fold lines F2, F3 disposed closest to each other, as shown in FIG. 4. However, those of ordinary skill in the art will recognize that alternative configurations of the body 436 are contemplated to be within the spirit and scope of the present invention. For example, it is contemplated that the body 436 may be formed such that the entirety of the bottom surface 412 of the folded flex 410 may be covered, with only that portion of the top surface 414 extending between the lateral peripheral edge segment 418a and the closest one of the fold lines F3 thereto being exposed in the body 436. Additionally, though the flex 410 is preferably folded along the fold lines F2 to facilitate the formation of the sloped section 434, it is also contemplated that the memory card 400 may be formed so as not to include the sloped section 434, thus eliminating any folding thereof along the fold lines F2.

Referring now to FIGS. 5, 5A and 5B, there is shown a memory card 500 constructed in accordance with a fifth embodiment of the present invention. The memory card 500 of the fifth embodiment bears similarity in construction to the memory card 100 of the first embodiment, with the 500 series reference numerals in FIGS. 5, 5A and 5B being used to identify the same structures identified by the corresponding 100 series reference numerals included in FIGS. 1, 1A and 1B. In this regard, only the distinctions between the memory cards 500, 100 will be discussed below.

The memory card 500 includes a flex 510. The flex 510 defines a generally planar bottom surface 512 and an opposed, generally planar top surface 514. The flex 510 has a generally quadrangular (e.g., rectangular) configuration defining an opposed pair of longitudinally extending peripheral edge segments 516a, 516b and an opposed pair of laterally extending peripheral edge segments 518a, 518b. Disposed on the bottom surface 512 of the flex 510 is a plurality of external signal contacts (ESCs) 520. As shown in FIG. 5B, the contacts 520 are arranged in a single row which extends in close proximity and in generally parallel relation to the a portion (i.e., approximately one-half of the length) of the longitudinal peripheral edge segment 516a of the flex 510. In this regard, one end of the row of the contacts 520 terminated just slightly inward of the lateral peripheral edge segment 518a of the flex 510. Disposed on the top surface 514 of the flex 510 is a conductive pattern 522, only a portion of which is shown in FIG. 5B. The conductive pattern 522 is placed into electrical communication with the contacts 520 on the bottom surface 512 through a conductive medium formed through and/or upon the flex 510. Such conductive medium may include conductive vias and/or conductive traces which extend through and/or along the flex 510.

Mounted to the top surface 514 of the flex 510 and electrically connected to the conductive pattern 522 disposed thereon is a plurality of memory devices 524. As shown in FIG. 5B, the memory devices 524 are mounted to the flex 510 in a manner wherein they are segregated into a first pair or set which is disposed in relative close proximity to the lateral peripheral edge segment 518a, and a second pair or set which is disposed in relative close proximity to the lateral peripheral edge segment 518b. In addition to the memory devices 524, also mounted to the top surface 514 of the flex 510 and electrically connected to the conductive pattern 522 is a controller device 526. As also shown in FIG. 5B, it is contemplated that the controller device 526 will be located between the memory devices 524 of the first set and the longitudinal peripheral edge segment 516a of the flex 510. More particularly, the controller device 526 is located on the top surface 514 between the memory devices 524 of the first set and the contacts 520 disposed on the opposed bottom surface 512 of the flex 510. As is further seen in FIG. 5B, in addition to the memory and controller devices 524, 526, the memory card 500 is preferably provided with a plurality of passive devices 530 which are also mounted to the top surface 514 of the flex 510 and electrically connected to the conductive pattern 522 thereof. In the memory card 500, the passive devices 530 are located between the memory devices 524 of the second set and the longitudinal peripheral edge segment 516a of the flex 510.

In fabricating the memory card 500, the flex 510 is originally provided in the unfolded state shown in FIG. 5B, with the memory, controller and passive devices 524, 526, 530 being mounted to the top surface 514 thereof and electrically connected to the conductive pattern 522. Prior or subsequent to such mounting and electrical connection, a stiffener 532 is adhesively attached to the top surface 514 of the flex 510. The stiffener 532 preferably has a generally quadrangular (e.g., rectangular) configuration, and is mounted to the flex 510 such that one of the longitudinal sides of the stiffener 532 extends along and in generally flush relation to that portion of the longitudinal peripheral edge 516a of the flex 510 along which the contacts 520 extend. Additionally, one of the lateral sides of the stiffener 532 extends along and in substantially flush relation to a portion of the lateral peripheral edge segment 518a. The opposite lateral side of the stiffener 532 extends along and in substantially flush relation to an elongate notch 533 which is disposed in the flex 510, and extends inwardly from the approximate center of the longitudinal peripheral edge segment 516a thereof (i.e., the length of the notch 533 and the width of the stiffener 532 are substantially equal to each other). The preferred width of the stiffener 532 is also such that, when affixed to the flex 510, the stiffener 532 overlaps the entirety of the contacts 520 located in opposed relation thereto on the bottom surface 512 of the flex 510.

After the stiffener 532 has been mounted to the flex 510 in the above-described manner and the memory, controller and passive devices 524, 526, 530 have been electrically connected thereto, the flex 510 is folded along a first set of fold lines F1 and a second set of fold lines F2 which are also shown in FIG. 5B. The folding of the flex 510 along the fold lines F1 effectively places the top surfaces of the memory devices 524 of the second set disposed closest to the lateral peripheral edge segment 518b in direct engagement with the top surfaces of the memory devices 524 of the first set disposed closest to the contacts 520 in the manner best shown in FIG. 5. The folding of the flex 510 along the fold lines F1 also causes the passive devices 530 to assume positions disposed generally above and in spaced relation to the stiffener 532 and controller device 526, as also shown in FIG. 5. The folding of the flex 510 along the fold lines F2 facilitates the formation of a step 534 in the flex 510 which results in that portion of the flex 510 having the stiffener 532 mounted thereto and the contacts 520 formed thereon (i.e., the portion of the flex 510 extending between the longitudinal peripheral edge segment 516a and the fold line F2 closest thereto, and between the notch 533 and the lateral peripheral edge segment 518a) being offset or slightly elevated relative to that portion of the flex 510 extending between the lateral peripheral edge segment 518a and the fold line F1 disposed closest thereto.

As best shown in FIG. 5, the fully formed body 536 of the memory card 500 covers the memory, controller and passive devices 524, 526, 530, the stiffener 532, and the entirety of the exposed portion of the top surface 514 of the flex 510, including the conductive pattern 522 disposed thereon. As seen in FIGS. 5 and 5A, the fully formed body 536 also defines a generally planar front or leading side 538 which extends forwardly of and slightly beyond vertically aligned portions of the longitudinal peripheral edge segment 516a of the folded flex 510, and a generally planar rear or trailing side 540 which extends slightly rearwardly beyond vertically aligned portions of the longitudinal peripheral edge segment 516b of the folded flex 510. The body 536 further defines a generally planar side surface 542 which extends between vertically aligned portions of the lateral peripheral edge segments 518a, 518b of the folded flex 510, as shown in FIG. 5A.

In the memory card 500, the height of the leading side 538 of the body 536 is slightly less than that of the trailing side 540 thereof. Advantageously, the formation of the step 534 in the flex 510 accommodates this height differential and allows the contacts 520 to be maintained in generally co-planar relation to a bottom surface 544 of the body 536 which extends to the leading side 538 thereof. Due to the manner in which the body 536 is preferably formed, the bottom surface 512 of the folded flex 510 remains exposed in the memory card 500. However, those of ordinary skill in the art will recognize that alternative configurations of the body 536 are contemplated to be within the spirit and scope of the present invention. For example, it is contemplated that the body 536 may be formed such that the entirety of the bottom surface 512 of the folded flex 510, except for that portion thereof extending between the longitudinal peripheral edge segment 516a and the closest one of the fold lines F2 thereto, may be covered by the body 536. Additionally, though the flex 510 is preferably folded along the fold lines F2 to facilitate the formation of the step 534, it is also contemplated that the memory card 500 may be formed so as not to include the step 534, thus eliminating any folding thereof along the fold lines F2.

Referring now to FIG. 6, there is shown a memory card 600 constructed in accordance with a sixth embodiment of the present invention. The memory card 600 comprises a rigid laminate substrate 610 which defines a generally planar bottom surface 612 and an opposed, generally planar top surface 614. It is contemplated that the rigid laminate substrate 610 will have a generally quadrangular (e.g., rectangular) configuration defining opposed pairs of elongate peripheral edge segments. Disposed on the top surface 614 is a conductive pattern (not shown).

Mounted to the top surface 614 of the laminate substrate 610 and electrically connected to the conductive pattern disposed thereon is a plurality of memory devices 624. The memory devices 624 are preferably segregated into a number of stacks, with each such stack including a bottom memory device 624 which is attached to the top surface 614 and electrically connected to the conductive pattern of the laminate substrate 610, and a top memory device 624 which is disposed on and electrically connected to the bottom memory device 624 of the corresponding stack. In addition to the memory devices 624, also mounted to the top surface 614 of the laminate substrate 610 and electrically connected to the conductive pattern thereon is a controller device 626 and at least one passive device 630. The controller and passive devices 626, 630 are each electrically connected to the conductive pattern of the laminate substrate 610 through the use of a flip-chip type connection, though wire bond or surface mount type connections may also be used to facilitate such electrical connection. Each memory device 624 may comprise flash memory having a prescribed data storage capacity. The controller device 626 preferably comprises a semiconductor die having the logic necessary for controlling the operation of the memory card 600. Since the controller device 626 is electrically connected to the memory devices 624 of the stacks thereof included in the memory card 600 by the conductive pattern of the laminate substrate 610, the controller device 626 is operative to control to the processes of the memory card 600. Those of ordinary skill in the art will recognize that the memory devices 624 integrated into the memory card 100 need not necessarily be provided in a stacked arrangement therein.

The memory card 600 further comprises a flexible substrate 608, hereinafter referred to as the flex 608. The flex 608 is preferably an insulative sheet which defines a generally planar bottom surface 616 and an opposed, generally planar top surface 618. The flex 608 has a generally quadrangular (e.g., rectangular) configuration defining opposed pairs of longitudinally and laterally extending peripheral edge segments. The memory card 600 also includes a stiffener 632 which is adhesively attached to the bottom surface 616 of the flex 608. The stiffener 632 preferably has a generally quadrangular (e.g., rectangular) configuration, and is mounted to the flex 608 such that the longitudinal and lateral sides of the stiffener 632 extend along and in generally flush relation to respective ones of the longitudinal and lateral peripheral edge segments defined by the flex 608. Disposed on that surface of the stiffener 632 opposite that attached to the bottom surface 616 of the flex 608 is a plurality of external signal contacts (ESCs) 620. As will be recognized, the contacts 620 are used to facilitate the electrical connection of the memory card 600 to the pins or contacts within the host socket of an external device with which the memory card 600 is to be used. Disposed on the top surface 618 of the flex 608 is a conductive pattern. The conductive pattern on the top surface 618 is placed into electrical communication with the contacts 620 on the stiffener 632 through the use of a conductive medium formed through and/or upon the flex 608 and stiffener 632. Such conductive medium may include conductive vias and/or conductive traces which extend through and/or along the flex 608 and stiffener 632.

In the memory card 600, one of the longitudinal peripheral edge segments of the flex 608 is attached to a corresponding one of the peripheral edge segments of the laminate substrate 610. Such attachment is also facilitated in a manner wherein the conductive pattern of the flex 608 is placed into electrical communication with the conductive pattern of the laminate substrate 610. As a result, the communicating conductive patterns effectively place both the memory devices 624 and controller 626 into electrical communication with the contacts 620. As shown in FIG. 6, it is contemplated that the controller and passive devices 626, 630 will be located on the top surface 614 between the flex 608 and the memory devices 624.

The attachment of the flex 608 to the laminate substrate 610 is preferably completed in a manner wherein the flex 608 defines a step 634, thus resulting in that portion of the flex 608 having the stiffener 632 attached thereto and the laminate substrate 610 extending along respective ones of a spaced, generally parallel pair of planes. As is shown in phantom in FIG. 6, it is contemplated that the controller and passive devices 626, 630 may alternatively be placed directly upon and electrically connected to the conductive pattern disposed on the top surface 618 of the flex 608.

The memory card 600 further comprises a layer of encapsulant material which ultimately hardens into a body 636 of the memory card 600. As shown in FIG. 6, the fully formed body 636 covers the memory, controller and passive devices 624, 626, 630, and the entirety of the top surfaces 614, 618 of the laminate substrate 610 and flex 608, respectively. The fully formed body 636 also defines a generally planar front of leading side 638 which extends forwardly of and slightly beyond the flex 608, and a generally planar rear or trailing side 640 which extends slightly rearwardly beyond the laminate substrate 610.

In the memory card 600, the height of the leading side 638 of the body 636 is slightly less than that of the trailing side 640 thereof. The formation of the step 634 in the flex 608 accommodates this height differential and allows the contacts 620 to be maintained in relative close proximity to a bottom surface 644 of the body 636 which extends to the leading side 638 thereof. Due to the manner in which the body 636 is preferably formed, both the bottom surface 616 of the flex 608, the stiffener 632, and the bottom surface 612 of the laminate substrate 610 remain exposed therein. However, those of ordinary skill in the art will recognize that alternative configurations of the body 636 are contemplated to be within the spirit and scope of the present invention. For example, it is contemplated that the body 636 may be formed such that the entirety of the bottom surface 612 of the laminate substrate 610 is covered thereby. It is also contemplated that the memory card 600 may be formed so as not to include the step 634 in the flex 608.

Figure 7:
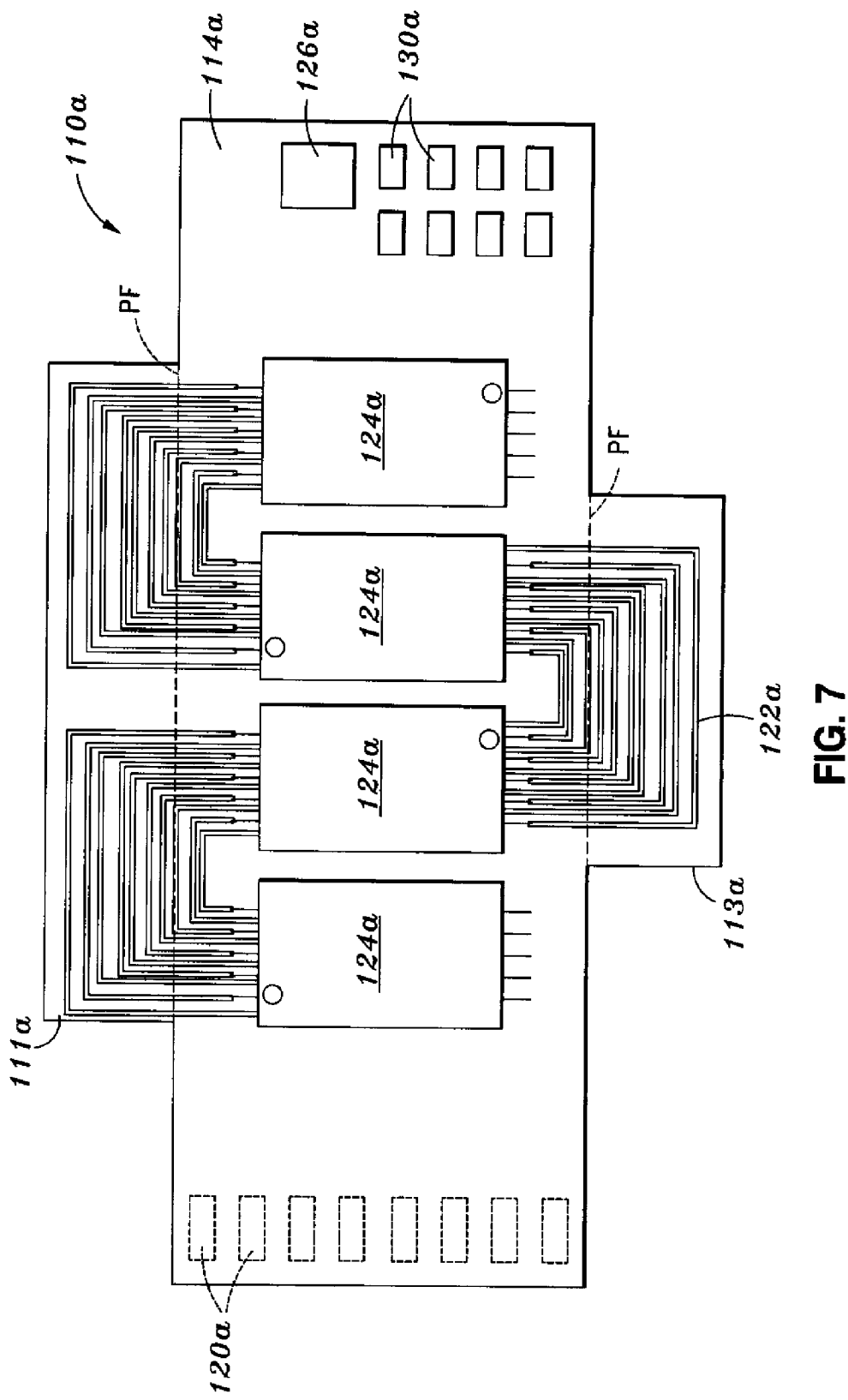
FIG. 7 is a top plan view of an alternative flex in an unfolded state which may optionally be integrated into any of the memory cards of the embodiments shown in FIGS. 1-4.

Referring now to FIG. 7, there is shown a flex 110a which may be integrated into the memory card 100 of the first embodiment as an alternative to the above-described flex 110. The flex 110a is also an insulative sheet which defines a generally planar bottom surface and an opposed, generally planar top surface 114a. Disposed on the bottom surface is a plurality of external signal contacts (ESCs) 120a. Disposed on the top surface 114a is a conductive pattern 122a. The conductive pattern 122a is placed into electrical communication with the contacts 120a through a conductive medium formed through and/or on the flex 110a. Such conductive medium may include conductive vias and/or conductive traces which extend through and/or along the flex 110a.

Mounted to the top surface 114a of the flex 110a and electrically connected to the conductive pattern 122a disposed thereon are a plurality of memory devices 124a, a controller device 126a and a plurality of passive devices 130a. The orientation of the contacts 120a on the bottom surface of the flex 110a and the orientation of the memory, controller and passive devices 124a, 126a, 130a on the top surface 114a is identical to that described above in relation to the contacts 120 and the memory, controller and passive devices 124, 126, 130 of the flex 110 shown in FIG. 1B. In this regard, the sole distinction between the flex 110a and the flex 110 lies in the addition of an integral pair of ear portions 111a, 113a to the flex 110a. As shown in FIG. 7, the flex 110a includes preliminary fold lines PF which extend between the ear portions 111a, 113a and the remainder of the flex 110a which has a generally quadrangular (e.g., rectangular) configuration. The inclusion of the ear portions 111a, 113a allows the flex 110a to accommodate the conductive pattern 122a which is of a size/configuration exceeding that of the conductive pattern 122, and thus requires the additional area provided by the ear portions 111a, 113a in the flex 110a.

In the flex 110a, it is contemplated that either prior or subsequent to the electrical connection of the memory, controller and passive devices 124a, 126a, 130a to the conductive pattern 122a, the ear portions 111a, 113a will be folded along the fold lines PF, and secured via an adhesive to corresponding portions of the bottom surface of the flex 110a. As will be recognized by those of ordinary skill in the art, the folding of the ear portions 111a, 113a along the fold lines PF causes the flex 110a to assume the same basic configuration as that shown in FIG. 1B in relation to the flex 110. Additionally, those of ordinary skill in the art will recognize that the flexes 210, 310 and 410 described above may likewise be modified to include ear portions similar to the ear portions 111a, 113a described in relation to the flex 110a.

Referring now to FIG. 8, there is shown a flex 510a which may be integrated into the memory card 500 as an alternative to the above-described flex 510. The flex 510a is also an insulative sheet which defines a generally planar bottom surface and an opposed, generally planar top surface 514a. Though not shown in FIG. 8, disposed on the top surface 514a is a conductive pattern, while mounted to the top surface 514a and electrically connected to the conductive pattern are a plurality of memory devices, a controller device and a plurality of passive devices. The orientation of these memory, controller and passive devices on the top surface 514a may be identical to or substantially similar to that described above in relation to the memory, controller and passive devices 524, 526 and 530 of the flex 10 shown in FIG. 5B. In this regard, the primary distinction between the flex 510a and the flex 510 lies in the addition of an integral ear portion 511a to the flex 510a. As shown in FIG. 8, the flex 510a includes a preliminary fold line PF which extends between the ear portion 511a and the remainder of the flex 510a which has a generally quadrangular configuration. The ear portion 511a defines a top surface which, when the flex 510a is in its fully unfolded state as shown in FIG. 8, is continuous with the top surface 514a. Disposed on the top surface of the ear portion 511a are the contacts 520a of the flex 510a, such contacts 520a being electrically connected to the conductive pattern of the flex 510a.

In the flex 510a, it is contemplated that either prior or subsequent to the electrical connection of the memory, controller and passive devices to the conductive pattern thereof, the ear portion 511a will be folded along the fold line PF, and secured via an adhesive to a corresponding portion on the bottom surface of the flex 510a. As will be recognized by those of ordinary skill in the art, the folding of the ear portion 511a along the fold line PF causes the flex 510a to assume the same basic configuration as that shown in FIG. 5B in relation to the flex 510. As is shown in phantom in FIG. 8, it is contemplated that the stiffener 532a which will be used in conjunction with the flex 510a may be attached to a portion of the top surface 514a which causes the stiffener 532a to overlap and thus provide structural support to the contacts 520a disposed on the folded over ear portion 511a.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A memory card comprising:
a flexible substrate having a conductive pattern and a plurality of contacts which are each formed directly thereon, the contacts being electrically connected to the conductive pattern;
a plurality of electronic components mounted to the substrate and electrically connected to the conductive pattern on the substrate, the substrate being configured in a manner wherein the electronic components are disposed between juxtaposed portions of the substrate; and
a body formed between the juxtaposed portions of the substrate and covering each of the electronic components;
wherein the contacts are not covered by the body and are positioned on the substrate so as to be exposed in the memory card.

2. The memory card of claim 1 wherein the body is formed such that at least a portion of the substrate is completely covered thereby, and wherein the body defines a leading side adjacent the plurality of contacts and an opposed trailing side, wherein the height of the leading side is less than the height of the trailing side so that the plurality of contacts are generally co-planar to a surface of the flexible substrate that extends toward the leading side thereof, and wherein the body covers opposing sides of the flexible substrate at one of the leading side or the trailing side.

3. The memory card of claim 1 wherein the substrate defines an interior surface having the conductive pattern formed directly thereon and the electronic components mounted thereto, and an exterior surface having the contacts formed directly thereon.

4. The memory card of claim 3 further comprising a stiffener attached to the substrate to provide structural support to the contacts formed directly thereon.

5. The memory card of claim 4 wherein the stiffener is attached to the interior surface at a location which is disposed in opposed relation to contacts formed directly on the exterior surface, and is covered by the body, and wherein the stiffener overlaps the entirety of the plurality of contacts.

6. The memory card of claim 4 wherein the stiffener is at least partially wrapped within a portion of the substrate.

7. The memory card of claim 1 wherein at least some of the electronic components are disposed in a stacked arrangement between the juxtaposed portions of the substrate.

8. The memory card of claim 7 wherein the electronic components comprise active and passive devices.

9. The memory card of claim 8 wherein the active devices comprise a controller device and a plurality of memory devices, and the memory devices are arranged in stacked pairs between the juxtaposed portions of the substrate.

10. The memory card of claim 1 wherein the substrate includes at least one ear portion which has at least a portion of the conductive pattern formed directly thereon.

11. The memory card of claim 1 wherein the substrate includes at least one ear portion which has the contacts formed directly thereon.

12. A memory card comprising:
a continuous, flexible substrate defining a partially enclosed interior cavity and including a plurality of contacts which are formed directly thereon;
a plurality of electronic components disposed within the interior cavity and electrically connected to the contacts; and
a body at least partially filling the interior cavity and covering each of the electronic components disposed therein;
wherein the contacts are not disposed within the interior cavity so as to be exposed in the memory card.

13. The memory card of claim 12 wherein the substrate includes a conductive pattern which is at least partially disposed within the interior cavity and electrically connected to the contacts, the electronic components being electrically connected to the conductive pattern.

14. The memory card of claim 12 wherein the body is formed such that at least a portion of the substrate is completely covered thereby, and wherein the body defines a leading side adjacent the plurality of contacts and an opposed trailing side, wherein the height of the leading side is less than the height of the trailing side so that the plurality of contacts are generally co-planar to a surface of the flexible substrate that extends toward the leading side thereof, and wherein the body covers opposing sides of the flexible substrate at one of the leading side or the trailing side.

15. The memory card of claim 12 further comprising a stiffener attached to the substrate to provide structural support to the contacts formed directly thereon.

16. The memory card of claim 15 wherein the stiffener is disposed within the interior cavity at a location which is disposed in overlapping relation to contacts, and is covered by the body.

17. The memory card of claim 12 wherein at least some of the electronic components are disposed in a stacked arrangement within the interior cavity of the substrate.

18. The memory card of claim 12 wherein the substrate includes at least one ear portion which has the contacts formed directly thereon.

19. The memory card of claim 13 wherein the substrate includes at least one ear portion which has at least a portion of the conductive pattern formed directly thereon.

20. A memory card comprising:
a rigid substrate having a peripheral edge and a conductive pattern which is formed directly thereon;
a flexible substrate having a peripheral edge and a plurality of contacts which are formed directly thereon, portions of the peripheral edges of the flexible substrate and the rigid substrate being attached to each other such that the contacts are electrically connected to the conductive pattern;
a plurality of electronic components mounted to the rigid substrate and electrically connected to the conductive pattern; and
a body partially covering the rigid and flexible substrates such that each of the electronic components are encapsulated by the body and the contacts are exposed in the memory card.

* * * * *